United States Patent
Pavesi et al.

(10) Patent No.: US 7,036,095 B2
(45) Date of Patent: Apr. 25, 2006

(54) CLOCK GENERATION SYSTEM FOR A PROTOTYPING APPARATUS

(75) Inventors: Marco Pavesi, Vigevano (IT); Maurizio Grassi, Pregnana Milanese (IT); Fabio De Pieri, Pogliano Milanese (IT); Mauro Ferloni, Milan (IT); Riccardo Gemelli, S. Colombano/L (IT)

(73) Assignee: Italtel S.P.A., Milan (IT)

( * ) Notice: Subject to any disclaimer, the term of this patent is extended or adjusted under 35 U.S.C. 154(b) by 0 days.

(21) Appl. No.: 10/212,120

(22) Filed: Aug. 6, 2002

(65) Prior Publication Data

US 2003/0074637 A1   Apr. 17, 2003

(30) Foreign Application Priority Data

Oct. 16, 2001   (EP)   .................................. 01830646

(51) Int. Cl.
*G06F 17/50*   (2006.01)
(52) U.S. Cl. ............................................. 716/1; 716/4
(58) Field of Classification Search .................... 716/1, 716/4–5, 16; 703/20, 28; 331/16, 18
See application file for complete search history.

(56) References Cited

U.S. PATENT DOCUMENTS

| 4,622,668 | A | 11/1986 | Dancker et al. |
| 6,377,912 | B1* | 4/2002 | Sample et al. ................. 716/1 |
| 6,400,682 | B1* | 6/2002 | Regula ........................ 370/223 |
| 6,502,221 | B1* | 12/2002 | Vogel et al. .................... 716/1 |
| 6,557,068 | B1* | 4/2003 | Riley et al. ................. 710/306 |
| 6,646,645 | B1* | 11/2003 | Simmonds et al. ......... 345/502 |
| 6,651,225 | B1* | 11/2003 | Lin et al. ...................... 716/4 |

* cited by examiner

*Primary Examiner*—Paul Dinh
(74) *Attorney, Agent, or Firm*—Birch, Stewart, Kolasch & Birch, LLP

(57) ABSTRACT

A clock signal generation and distribution system for a prototyping apparatus of an electronic system comprises at least one clock signal generation and distribution subsystem for distributing at least one clock signal to the prototyped electronic system implemented by the prototyping apparatus through a clock signal distribution network of the prototyping apparatus. The at least one clock signal generation and distribution subsystem comprises a clock source selector for selecting the at least one clock signal to be distributed to the prototyped electronic system among a group of source clock signals, the group including at least one first source clock signal derived from the prototyped electronic system and at least one second source clock signal not derived from the prototyped electronic system.

2 Claims, 8 Drawing Sheets

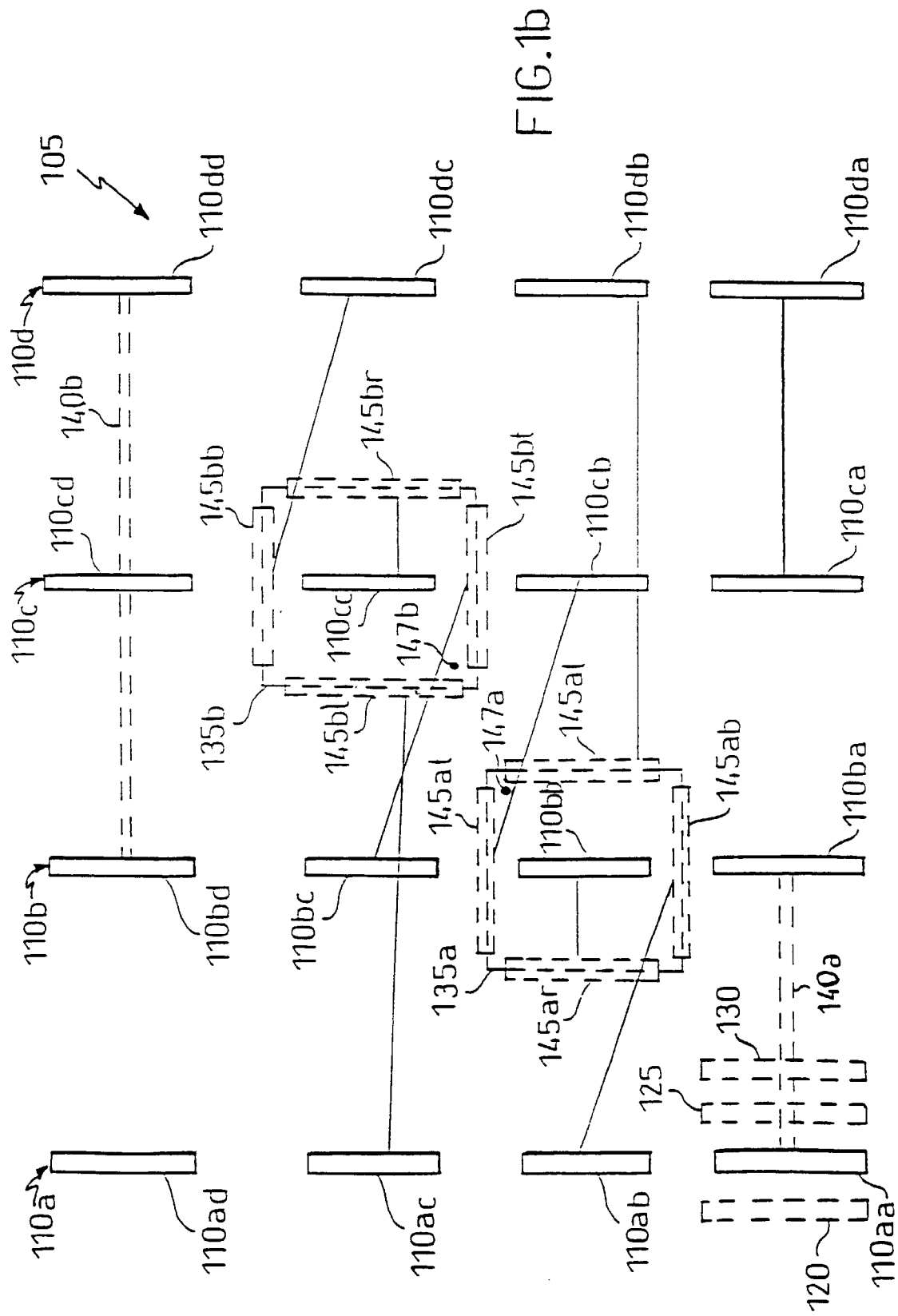

CLOCK GENERATION SYSTEM FOR A PROTOTYPING APPARATUS

FIELD OF THE INVENTION

The present invention relates to the field of prototyping apparatuses.

BACKGROUND OF THE INVENTION

Prototyping apparatuses are commonly used for validating electronic circuits. A prototyping apparatus makes it possible to create a physical implementation of the electronic circuit under validation (a prototype). The prototype is tested in order to determine whether the electronic circuit exhibits the desired features; for example, this is an essential step of the design process of any complex electronic circuit, such as a digital ASIC (Application Specific Integrated Circuit).

Typically, the prototype is created spreading the electronic circuit across several FPGAs (Field-Programmable Gate Arrays) which are connected together in a predetermined way.

Normally, the prototyping of the electronic circuit requires timing or clock signals with prescribed frequencies to be supplied to the FPGAs. A clock signal generation and distribution system is thus provided in the prototyping apparatus for generating and distributing the clock signals to the FPGAs across which the electronic circuit under validation is spread.

In some known prototyping apparatuses the clock signals can be generated locally in the clock signal generation and distribution system, by means of local oscillators. The locally-generated clock signals are then distributed through the prototyping apparatus to the FPGAs implementing the electronic circuit under validation.

In other known prototyping apparatuses the clock signals are instead generated externally of the prototyping apparatus, typically by a clock generator apparatus, and are fed to the clock signal generation and distribution system for the distribution to the FPGAs.

The Applicant notices that both of the above solutions have a common drawback. It may in fact happen that in an electronic circuit to be validated some clock signals are self-generated by the electronic circuit itself. In the known prototyping apparatuses these self-generated clock signals must be emulated by the internally- or externally-generated clock signals. This makes the prototyping apparatuses scarcely adherent to the real-world operation of the electronic circuit under validation, and the test results are therefore not completely reliable.

It has therefore been an object of the present invention to overcome the above mentioned drawback.

SUMMARY OF THE INVENTION

In order to achieve this object, a clock signal generation and distribution system as set forth in claim 1 is provided for.

Briefly, the clock signal generation and distribution system comprises at least one clock signal generation and distribution subsystem for distributing at least one clock signal to the prototyped electronic system, implemented by the prototyping apparatus, through a distribution network of the prototyping apparatus. The at least one clock signal generation and distribution subsystem comprises in turn a clock source selector for selecting the at least one clock signal to be distributed to the prototyped electronic system among a group of source clock signals. Such a group includes at least one first source clock signal derived from the prototyped electronic system under validation, and at least one second source clock signal not derived from the prototyped electronic system.

The second source clock signal can for example be generated locally to the clock signal generation and distribution subsystem by means of a local clock generator including a local oscillator, or it can be an external source clock signal derived from an externally-generated source clock signal, generated by a clock signal generator external to the prototyping apparatus, or even a signal derived from components of the prototyping apparatus different from the prototyped electronic system.

The local oscillator is for example a crystal oscillator, and the local clock generator is preferably programmable to set a frequency of the locally-generated source clock signal. A programmable controller can for example be used for programming the local clock generator.

The external source clock signal can be derived from the externally-generated source clock signal through a first programmable delay clock buffer, programmable to set a predetermined delay of the external source clock signal with respect to the externally-generated source clock signal.

The components of the prototyping apparatus different from the prototyped electronic system include for example a compact PCI subsystem.

The signal derived from components of the prototyping apparatus different from the prototyped electronic system is preferably derived from a compact PCI subsystem clock signal through a second programmable delay clock buffer programmable to set a prescribed delay.

The clock generator and distribution subsystem preferably comprises a low-skew clock distributor for distributing the at least one clock signal provided by the clock source selector onto a respective plurality of clock signal distribution lines of the prototyping apparatus with a minimum skew between the signals on the clock signal distribution lines.

If several clock signals are required, a plurality of clock signal generation and distribution subsystems are provided and a programmable switch matrix is provided for selectively feeding each clock signal generation and distribution subsystem with a respective first source clock signal chosen among a plurality of clock signals coming from the prototyped electronic system. The programmable switch matrix comprises for example a hardware programmable device, programmable during a configuration procedure of the prototyping apparatus.

According to another aspect of the present invention, a prototyping apparatus for prototyping an electronic system is provided comprising a clock signal generation and distribution system for generating and distributing clock signals to the prototyped electronic system implemented by the prototyping apparatus through a clock signal distribution network. The clock signal generation and distribution system is realized according to the present invention, with at least one clock signal generation and distribution subsystem comprising a clock source selector for selecting the at least one clock signal to be distributed to the prototyped electronic system among a group of source clock signals. Such a group includes at least one first source clock signal derived from the prototyped electronic system under validation, and at least one second source clock signal not derived from the prototyped electronic system.

According to still another aspect of the present invention, there is provided a method of prototyping an electronic system by means of a prototyping apparatus. The method comprises providing a clock signal distribution network, and distributing at least one clock signal to a prototyped electronic system implemented by the prototyping apparatus through the clock signal distribution network.

The distributing comprises selecting the at least one clock signal to be distributed to the prototyped electronic system among a group of source clock signals, the group including at least one first source clock signal derived from the prototyped electronic system and at least one second source clock signal not derived from the prototyped electronic system.

BRIEF DESCRIPTION OF THE DRAWINGS

The features and advantages of the present invention will be made apparent by the following detailed description of an embodiment thereof, given purely by way of a non-limiting example, with reference to the attached drawings, wherein:

FIG. 1b schematically shows a back-plane of the prototyping apparatus of FIG. 1a;

DETAILED DESCRIPTION OF THE PREFERRED EMBODIMENT

In the following, the invention will be described making reference to an exemplary embodiment of prototyping apparatus.

Figure 1A:
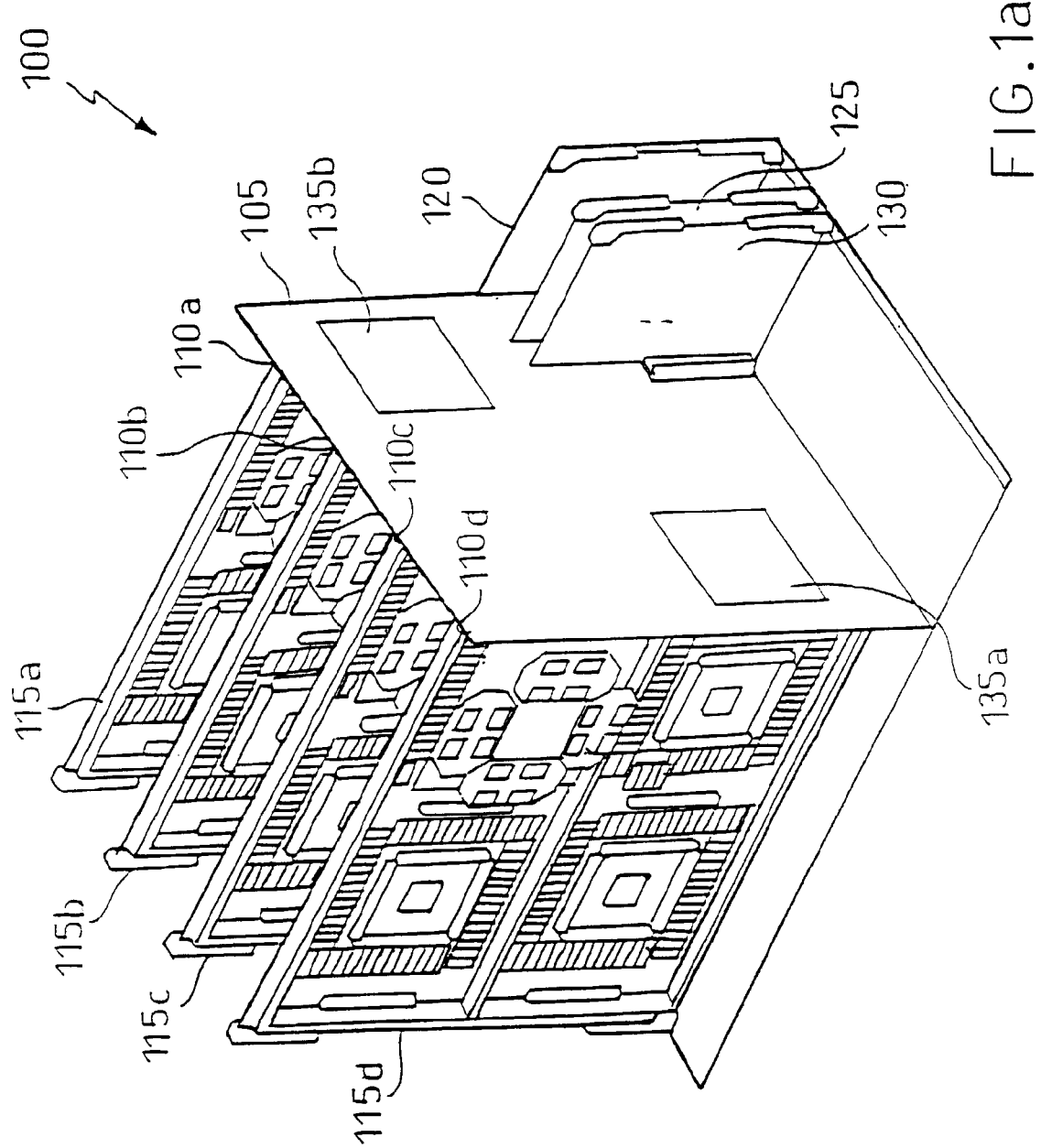
FIG. 1a is a perspective view of a prototyping apparatus according to an embodiment of the present invention.

Referring to FIG. 1a, there is shown an apparatus 100 used as a physical platform for the fast prototyping of an electronic circuit. The prototyping apparatus 100 includes a back-plane 105, which consists of a multi-layer printed circuit board including supports for communicating with a host computer (not shown in the figure), both for downloading programming data for configuring the prototyping apparatus and for uploading data captured during a process of prototyping of the electronic circuit.

Referring now jointly to FIGS. 1a and 1b, the back-plane 105 has a plurality (four in the shown example) of slots 110a, 110b, 110c and 110d arranged on a front surface thereof. A main circuit board 115a, 115b, 115c and 115d is plugged into a respective one of the slots 110a, 110b, 110c and 110d. The back-plane 105 is also provided with several system boards, which are plugged into corresponding slots arranged on a rear surface of the back-plane 105, such as a compact PCI single board computer 120, a compact PCI carrier 125, and a clock signal generation and distribution system board 130.

Two cross-bar boards 135a and 135b are plugged into corresponding sockets on the rear surface of the back-plane 105. The cross-bar boards 135a, 135b are arranged along a diagonal of the back-plane 105.

It is pointed out that the back-plane may have a different number of slots for accommodating more or less than four main boards, and the slots for the main boards may be differently arranged, for example the slots may be arranged on both the surfaces of the back-plane. Also, the slots for the main boards and those for the system boards may be all placed on a same surface, either front or rear, of the back-plane, and different system boards may be used.

Considering now the front surface of the back-plane 105 shown in the FIG. 1b, each slot 110i (with i=a ... d) consists of four slot elements 110ia, 110ib, 110ic and 110id. The slot elements 110aa, 110ba, 110ca and 110da are connected to a PCI bus 140a which is associated with the system boards 120, 125 mounted on the rear surface of the back-plane 105. Similarly, the slot elements 110ad, 110bd, 110cd and 110dd are connected to a further bus 140b, for example of the ISA type.

As will be described in detail later on, the clock signal generation and distribution system board 130 generates and distribute a plurality of clock signals, for example eight. The clock signals are distributed to all the slots 110a-110d by means of a balanced tree of conductive tracks on the back-plane 105, so as to minimize the skew of the clock signals in correspondence of the slots.

Each cross-bar board 135a, 135b is plugged into a respective socket, denoted as a whole with 145a, 145b, which is square-shaped and has a bottom element 145ab, 145bb, a top element 145at, 145bt, a left-hand element 145al, 145bl and a right-hand element 145ar, 145br with respect to an insertion key 147a, 147b for a reference key of the crossbar board 135a, 135b. The sockets 145a, 145b are arranged so as to have the respective insertion keys facing to each other.

The socket element 145at is electrically connected to the slot element 110cb, the socket element 145al is electrically connected to the slot element 110db, the socket element 145ab is electrically connected to the slot element 110ab, and the socket element 145ar is electrically connected to the slot element 110bb. Additionally, the socket element 145bt is electrically connected to the slot element 110bc, the socket element 145bl is electrically connected to the slot element 110ac, the socket element 145bb is electrically connected to the slot element 110dc, and the socket element 145br is electrically connected to the slot element 110cc.

Similar considerations apply if the back-plane has a different structure, if each slot consists of a different number of slot elements (down to a single one), if the buses 140a, 140b are of a different type or are shorter (for example connecting only three slot elements), if the sockets are used for plugging different components (such as a bridge), and so on.

Figure 2:
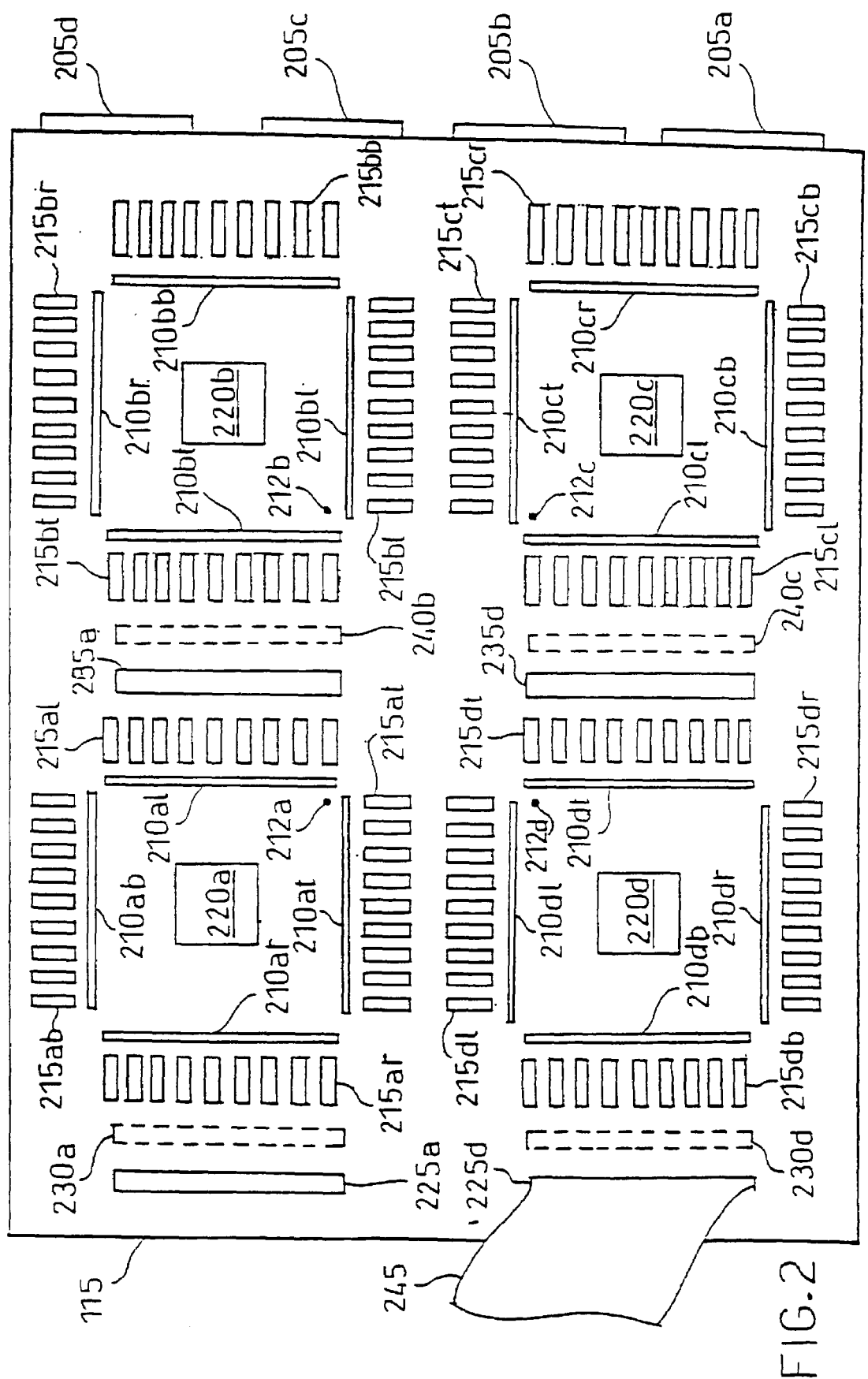
FIG. 2 shows a main board of the prototyping apparatus.

Referring now to FIG. 2, a generic main board 115 consists of a multi-layer printed circuit board, for example with sixteen layers, having an edge connector formed by four connector elements 205a, 205b, 205c and 205d, adapted to be plugged into the corresponding slot elements of a respective one of the slots 110a, 110b, 110c, 110d of the back-plane 105. The main board 115 is provided with four sockets 210a, 210b, 210c and 210d, arranged at respective edges of a rectangle on a front surface of the main board 115. The i-th socket 210i (with i=a ... d) is square-shaped and has a bottom element 210ib, a top element 210it, a left-hand element 210il and a right-hand element 210ir with respect to an insertion key 212i.

A bank of electronic switches 215a, 215b, 215c and 215d is placed around the respective socket. The i-th bank of switches consists of a bottom switch set 215ib, a top switch set 215it, a left-hand switch set 210il and a right-hand switch set 210ir, which are respectively associated with the socket elements 210ib, 210it, 210il and 210ir. The switches 215a, 215b, 215c and 215d are controlled by electrically erasable and programmable memories such as EEPROMs or Flash EEPROMs 220a, 220b, 220c and 220d, respectively, which are mounted onto the main board 115 inside the corresponding sockets 210a, 210b, 210c and 210d.

A forward connection socket 225, made up of two socket elements 225a and 225d, is provided on the front surface of the main board 115. The two socket elements 225a, 225d are placed on the left of the sockets 210a and 210d, respectively. A backward connection socket 230, made up of two socket elements 230a and 230d, is provided on a rear surface of the main board 115, with the two socket elements 230a and 230b placed on the right of the forward connection socket elements 225a and 225d, respectively. A further forward connection socket 235, made up of two socket elements 235a and 235d, is placed on the front surface of the main board 115, with the two socket elements 235a and 235b placed on the right of the sockets 210a and 210d, respectively. A further backward connection socket 240, made up of two socket elements 240b and 240c, is placed on the rear surface of the main board 115, with the two socket elements 240a and 240b placed on the left of the sockets 210b and 210c, respectively.

The forward connection sockets 225 and 235 are used to connect the main board 115 to a next adjacent main board facing the main board 115. Similarly, the backward connection sockets 230 and 240 are used to connect the main board 115 to a previous adjacent main board. In particular, each forward connection socket is connected to the corresponding backward connection socket of the next main board by means of a flat cable 245 terminating with matching connectors, as shown in the figure for the forward connection socket element 225d.

Figure 3A:
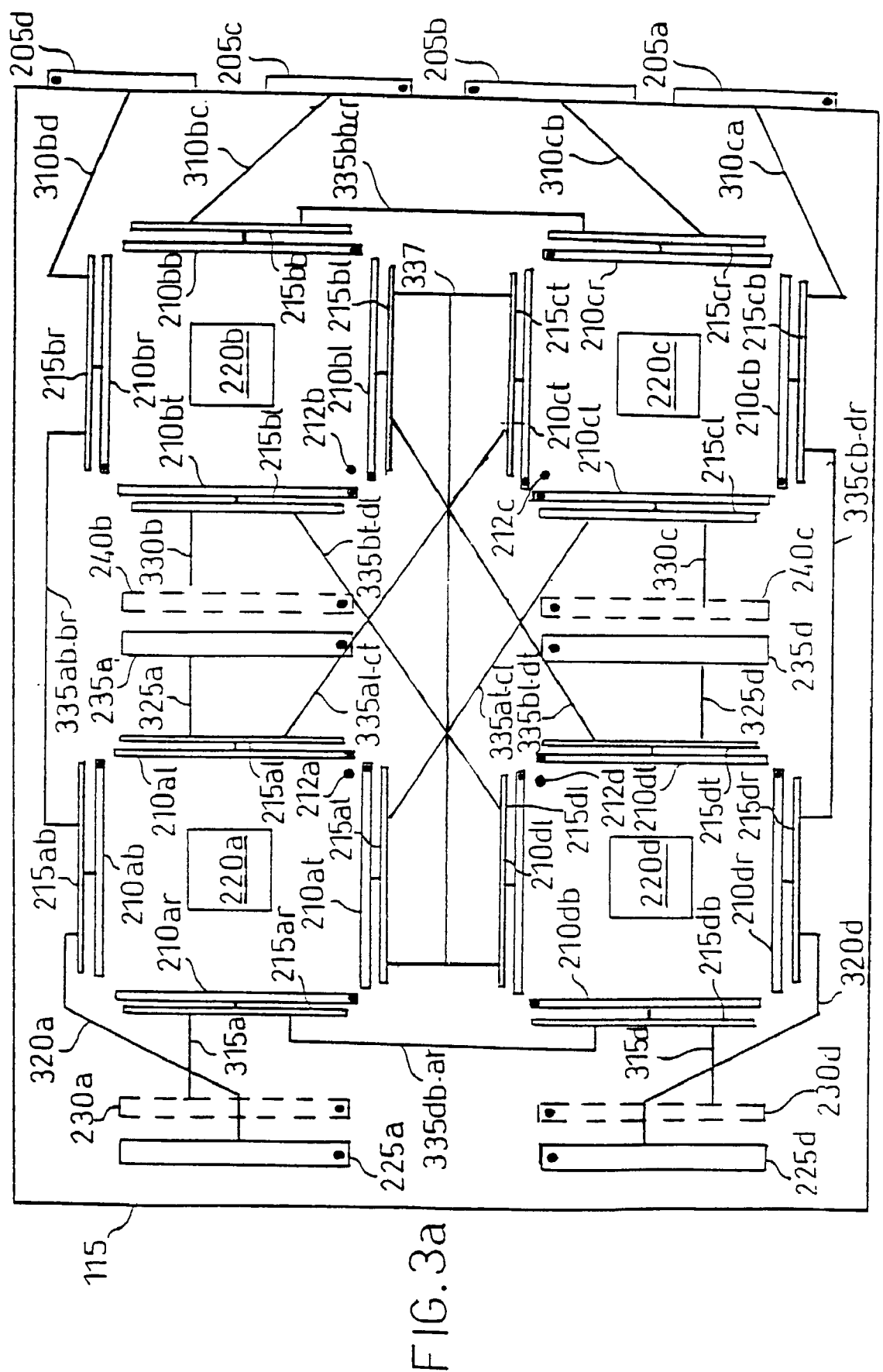
FIGS. 3a and 3b show a schematic functional diagram of the main board and a particular thereof, respectively.

With reference to FIG. 3a, each socket element of the sockets 210a–210d consists for example of 228 female leads, or holes, and 6 power supply holes for providing three distinct power supply voltages. The holes are numbered (from 0 to 227) starting from the insertion key along the adjacent socket elements. The sockets 210a–210d are turned so as to have the insertion keys 212a–212d facing inward the rectangle along which the sockets 210a–210d are arranged.

Each edge connector 205a–d consists of 228 male leads, or pins, and 6 power supply blades. The pins of the edge connector elements 205a and 205b are numbered from the bottom to the top, whereas the pins of the edge connector elements 205c–205d are numbered from the top to the bottom. The edge connector elements 205a and 205d allow the main board 115 to access the respective buses 140a, 140b provided on the back-plane, and the edge connector elements 205b and 205c allow the main board 115 to access the respective cross-bar boards plugged into the back-plane.

An electrical connection 310ca extends between the socket element 210cb and the edge connector element 205a, and an electrical connection 310bd extends between the socket element 210br and the edge connector element 205d. Additionally, an electrical connection 310cb extends between the socket element 210cr and the edge connector element 205b, and an electrical connection 310bc extends between the socket element 210bb and the edge connector element 205c.

The forward and backward connection sockets 225, 230, 235 and 240, each one consisting of 228 male leads numbered from the bottom to the top, are connected to corresponding socket elements. Particularly, an electrical connection 315a extends between the socket element 210ar and the forward connection socket element 225a, and an electrical connection 315d extends between the socket element 210db and the forward connection socket element 225d. Also, an electrical connection 320a extends between the socket element 210ab and the backward connection socket element 230a, an electrical connection 320d extends between the socket element 210dr and the backward connection socket element 230d, an electrical connection 325a extends between the socket element 210al and the forward connection socket element 235a, and an electrical connection 325d extends between the socket element 210dt and the forward connection socket element 235d. Moreover, an electrical connection 330b extends between the socket element 210bt and the backward connection socket element 240b, and an electrical connection 330c extends between the socket element 210cl and the backward connection socket element 240c.

The main board 115 further includes several point-to point electrical connections, connecting to each other pairs of the sockets 210a–d. Particularly, an electrical connection 335ab–br extends between the socket elements 210ab and 210br, an electrical connection 335bb–cr extends between the socket elements 210bb and 210cr, an electrical connection 335cb–dr extends between the socket elements 210cb and 210dr, and an electrical connection 335 db–ar extends between the socket elements 210db and 210ar. Moreover, an electrical connection 335al–ct extends between the socket elements 210al and 210ct, an electrical connection 335at–cl extends between the socket elements 210at and 210cl, an electrical connection 335bt–dl extends between the socket elements 210bt and 210dl, and an electrical connection 335bl–dt extends between the socket elements 210bl and 210dt.

Additionally, an electrical connection 337at–dl extends between a first half of the holes of the socket elements 210at and 210dl, and an electrical connection 337bl–ct extends between a first half of the holes of the socket elements 210bl and 210ct. An electrical connection 337at–bl extends between a second half of the holes of the socket elements 210at and 210bl, and an electrical connection 337ct–dl extends between a second half of the holes of the socket elements 210ct and 210dl. Preferably, the two halves of the holes of the socket elements are interleaved at blocks, each one consisting for example of 8 holes.

The above described electrical connections are implemented by means of one or more conductive tracks, each one provided on a corresponding layer of the main board 115, which are coupled through via-holes.

It is pointed out that the main board may have a different number of edge connector elements, the switches and the memories may be physically placed elsewhere, the main board may be provided with a different number of forward and backward connection sockets. The sockets may also have a different shape, be of the male type or include a different number of leads. The sockets may be coupled in a different manner with the edge connectors, the backward and forward connection sockets, or the other sockets, and the main board may be provided with a bus to which corresponding socket elements are connected in parallel, and the like.

All the above-mentioned electrical connections are connected to the socket elements of the sockets 210a–d via the associated electronic switch set.

Figure 3B:
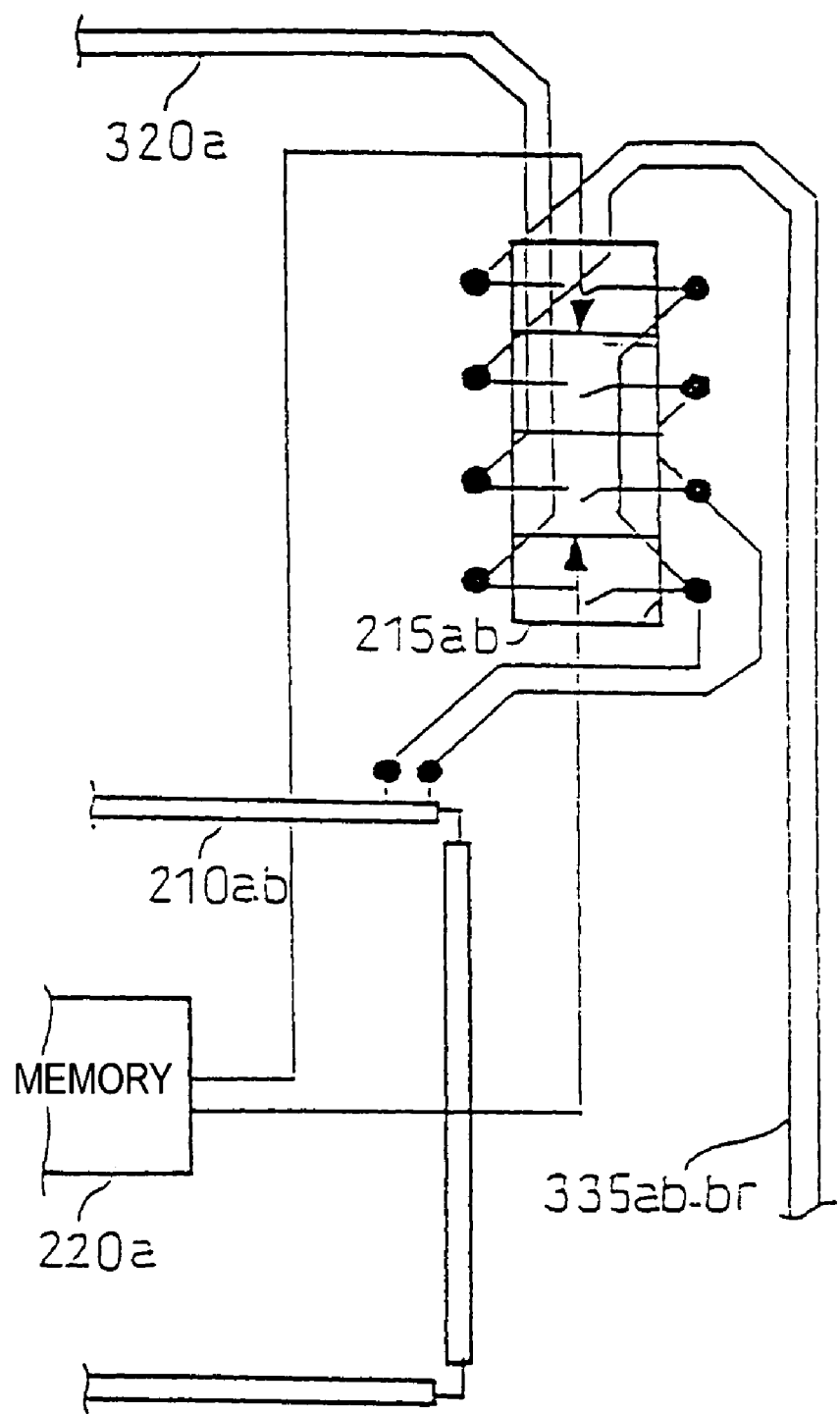

In particular, the holes of each socket element are selectively connected to one or more of the corresponding electrical connections by means of the respective switches. For example, as shown in FIG. 3b, each hole of the socket element 210ab is connected by means of a conductive track to a terminal of a first and a second of the switches 215ab.

The other terminal of the first switch is connected to a line of the electrical connection 320a, and the other terminal of the second switch is connected to a line of the electrical connection 335ab–br.

The electronic switches are for example implemented by means of pass transistors, controlled by signals provided by the memories 220a–d.

For example, referring again to FIG. 3b, the two switches associated with each hole of the socket element 210ab are controlled by respective signals provided by the memory 220a. A bit stored in the memory 220a can for example control the respective switch in an open or in a closed condition when the bit has the value 0 or 1, respectively. In this way, the combinations 01 and 10 alternatively connect the hole of the socket element 210ab to the corresponding line of the electrical connection 320a or of the electrical connection 335ab–br, whereas the combination 00 leaves the hole of the socket element 210ab disconnected from both the electrical connection 320a and the electrical connection 335ab–br. The combination 11, connecting the hole of the socket element 210ab simultaneously to the electrical connection 320a and to the electrical connection 335ab–br, is preferably not used, not to cause conflicts or contention problems.

Advantageously, the socket element 210ab is split into several sets of sequential holes, for example 28 sets each one of 8 holes, with the remaining 4 holes reserved for programming the system through a JTAG interface. All the switches 215ab associated with the holes of each set are controlled by the same pair of bits provided by the memory 220a.

It is pointed out that the switches may be implemented by different electronic components, the memories may control the switches in a different manner, each bit of the memories may control a different number of switches, and the like.

Figure 4A:
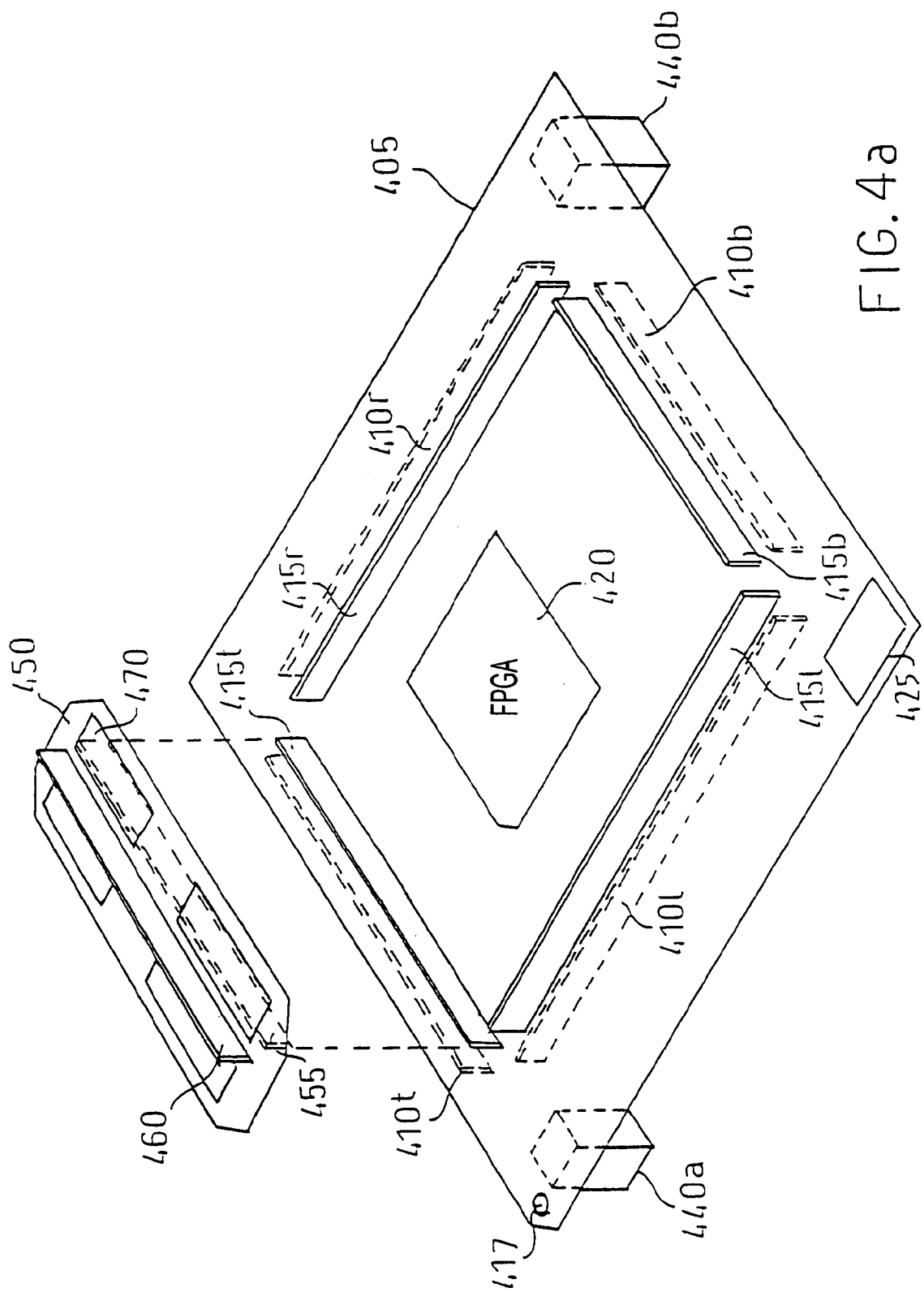
FIG. 4 is a perspective view of a secondary board of the prototyping apparatus, adapted to be mounted on a main board.

Coming now to FIG. 4, the prototyping apparatus includes one or more secondary boards 405, which are mounted onto the main boards 115 in respective sockets 210a–d. A connector 410 is arranged on a lower surface of the secondary board 405, and a socket 415 is arranged on an upper surface of the secondary board 405. The connector 410 and the socket 415 are square-shaped, and have a respective bottom element 410b, 415b, a respective top element 410t, 415t, a respective left-hand element 410l, 415l and a respective right-hand element 410r, 415r with respect to a reference key 417 for the insertion key of a corresponding socket of the main board. Each connector element 410t,b,l,r consists of 228 male leads, or pins, and 6 power blades and matches a corresponding socket element of the main board, and each socket element 415t,b,l,r consists of 228 holes and 6 power holes. The pins and the power blades of the connector 410 are coupled with corresponding holes of the socket 415 through conductive tracks and through holes (vias).

In one type of secondary board, an FPGA 420 and an electrically erasable and programmable memory 425 such as an EEPROM are mounted on the upper surface of the secondary board 405, inside the socket 415. Particularly, the secondary board 405 is provided with a plurality of conductive pads or other equivalent contacts for surface mounting of corresponding terminals of the FPGA 420 and the memory 425, for example of the ball grid array type. The memory 425 is used to configure the FPGA 420, to which it is connected through conductive tracks and through holes. The FPGA 420 has a reference edge, identified by a chamfer, which faces the insertion key 417.

Two power converters 440a and 440b are also mounted on the lower surface of the secondary board 405, at opposite edges thereof. The converters 440a,b are connected to the power blades of the connector 410 for receiving the power supply voltages provided by the back-plane through the main board 115. The converter 440a and the converter 440b supplies the FPGA 420 and the memory 425, respectively, for example with a voltage of lower value.

The pads of the secondary board 405 on which the FPGA 420 is mounted are connected to corresponding pins of the connector 410 and to corresponding holes of the socket 415. In this way, functional terminals of the FPGA 420, distinct from power supply terminals connected to the converter 440a and configuration terminals connected to the memory 425, are connected to both the connector 410 and the socket 415.

One to four auxiliary boards 450 (only one of which is shown in the figure) can be mounted onto the secondary board 405. A connector element 455 and an opposed socket element 460 are arranged on a lower surface and on an upper surface, respectively, of the auxiliary board 450. The connector element 455 consists of 228 male pins and 6 power blades matching a corresponding element of the socket 415, and the socket element 460 consists of 228 holes, without any power hole. The pins of the connector element 455 are coupled with corresponding holes of the socket element 460 through via-holes.

The auxiliary board 450 carries local resource devices such as memory modules used by the FPGA 420. Particularly, both the lower surface and the upper surface of the auxiliary board 450 are provided with a plurality of conductive pads for surface mounting of corresponding terminals of local memory modules 470 (four on both surfaces in the example shown in the figure). The pads of the auxiliary board 450 are connected to corresponding pins of the connector element 455 and to corresponding holes of the socket element 460: in this way, functional terminals of local memories 470, distinct from power supply terminals connected to the power blades of the connector 455, are connected to corresponding functional terminals of the FPGA 420.

The secondary board may have a different structure, the socket may have a different number of elements (down to a single element), the FPGA may be of a different type or it may be replaced by an MPGA (Mask Programmable Gate Array), an ASIC, an OTP (One Time Programmable) device or by one or more equivalent hardware programmable devices, wherein it is possible to configure the internal physical connections. Also, a different number of power converters may be provided (down to a single one), the auxiliary board may have a different structure and it may carry a different number of memory modules (down to a single one) or any other device which is locally used by the FPGA, and the like.

Another type of secondary board, different from the one shown in FIG. 4, which can be mounted on the main board includes for example a microprocessor, an electrically erasable and programmable non-volatile memory such as an EEPROM and a random access memory such as a SRAM, all these devices being mounted on the upper surface of the secondary board. The non-volatile memory stores a program to be executed by the microprocessor, and the random access memory is used by the microprocessor as a working memory. Also in this case, one or more additional, auxiliary boards similar to that identified by 450 carrying local memory modules may be plugged into one or more of the socket elements of a socket equivalent to the one identified by 415 in FIG. 4. A first sub-set of functional terminals of the microprocessor is coupled with the local memory modules and a second sub-set of functional terminals of the microprocessor is coupled with a connector equivalent to the one indicated as 410 in FIG. 4.

Other types of secondary boards may plugged into the sockets of the main boards, for example secondary boards carrying an I/O device or one or more equivalent non-hardware programmable devices, so to emulate a real-world environment for the electronic circuit to be validated, which in turn is implemented by means of secondary boards carrying FPGAs. The prototype of the electronic circuit and the emulation real world environment form altogether a prototype of an electronic system.

The secondary board 405, or any other type of secondary board, is mounted on the main board 115. Particularly, the connector 410 is plugged into one of the sockets 210a–d. The auxiliary boards, if any, are mounted on the secondary boards. Particularly, the connector element 455 of the secondary board is plugged into one of the socket elements 415t,b,l,r.

Albeit not shown in the drawings, the system further includes a debugging board, adapted to be mounted on one of the secondary boards, possibly through an interposed extender board. The debugging board includes multiple connectors arranged on a lower surface thereof, and multiple sockets arranged on an upper surface thereof. Each connector of the debugging board comprises connector elements matching corresponding socket elements of the auxiliary board or of the extender board. Each socket of the debugging board includes several holes for plugging corresponding probe terminals connected to an host computer. The connectors and the sockets of the debugging board are coupled through conductive tracks and through holes with a switch matrix, which selectively connects each pin of the connectors to a corresponding hole of the sockets of the debugging board.

Figure 5:
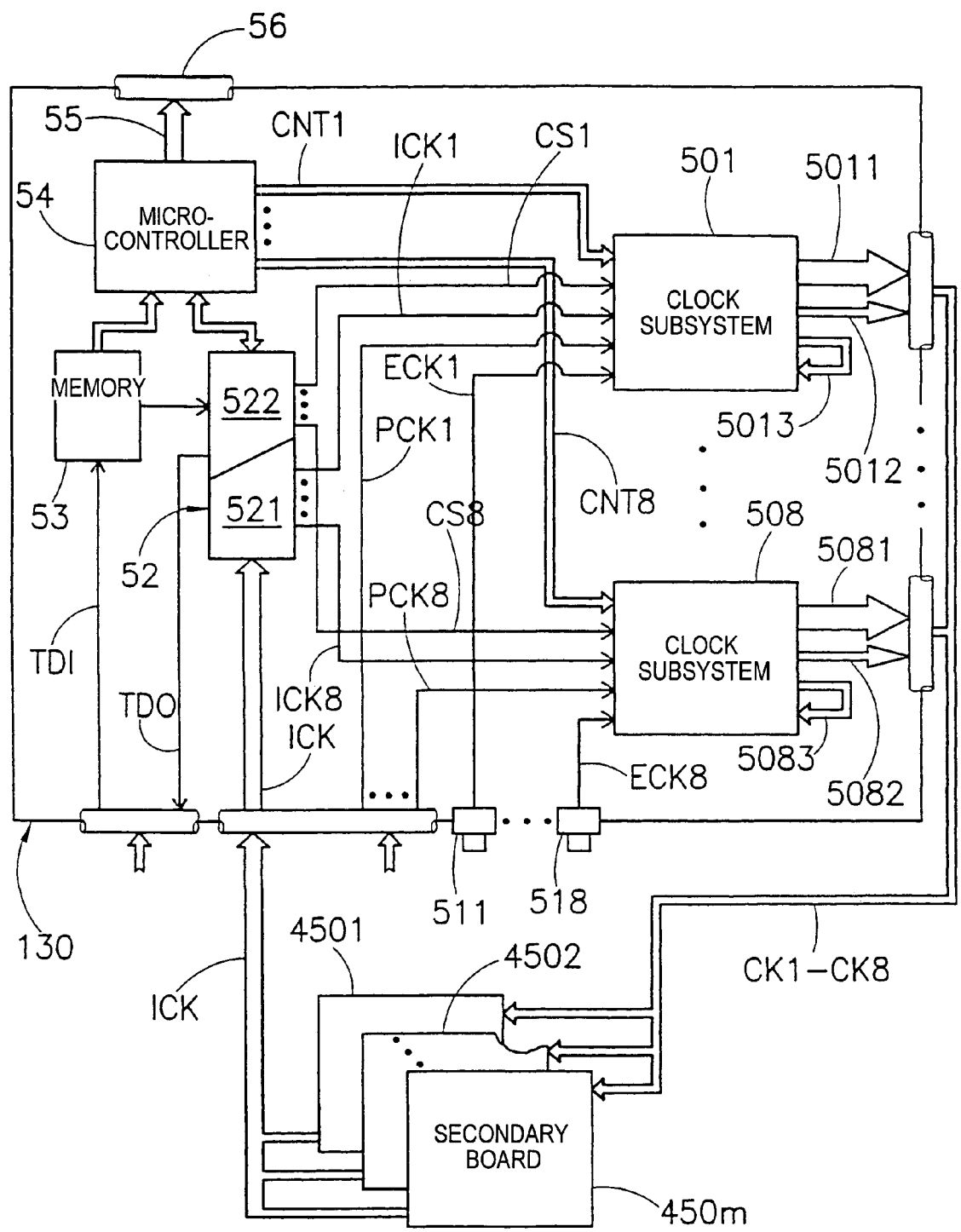
FIG. 5 is a schematic block diagram of a clock distribution board of the prototyping apparatus.

FIG. 5 is a schematic block diagram of a clock signal generation and distribution system board 130 according to an embodiment of the present invention, in the following also referred to as clock board, for the sake of conciseness. Additionally, FIG. 5 shows in an extremely schematic but explanatory way a clock signal distribution network for distributing the clock signals to the slots 210a–d of the main boards 115, and thus to the components, either FPGAs or microprocessors or I/O devices and the like, which form the prototyped electronic system and which are carried by secondary boards plugged into the sockets of the main boards. The clock signal distribution network is implemented by means of the electrical interconnection system of the prototyping apparatus, in particular by the back-plane buses 140a, 140b, the electrical connections between the back-plane slots and the sockets for the cross-bar boards, the electrical connections provided on each main board 115 between the elements of the connectors 200a–d and the elements of the sockets 210a–d, and the electrical connection between the elements of different sockets 210a–d.

The clock board 130 comprises a plurality (eight in the example) of clock signal generation and distribution subsystems 501–508, in the following briefly identified as clock subsystems. As will be explained in detail later on, each clock subsystem 501–508 generates and distribute one of the eight clock signals CK1–CK8, putting it on respective lines of the clock signal distribution network for the distribution of the clock signal to the prototyped electronic system, schematically represented as a plurality of secondary boards 4501–450m carrying FPGAs, microprocessors, I/O devices and so on. Through the clock signal distribution network, the eight clock signals CK1-CK8 are supplied to all the four socket elements of all the sockets 210a–d provided on the main boards 115a–d. The clock signals CK1–CK8, which in different prototyping apparatuses can be more or less than eight, are independent from each other. In this way, a plurality of different time bases is provided in the prototyping apparatus.

Each clock subsystem 501–508 has several inputs, for receiving multiple source clock signals and control signals, in particular clock generation/distribution mode selection signals.

Specifically, each clock subsystem 501–508 receives a respective internal source clock signal ICK1–ICK8. The internal source clock signals ICK1–ICK8 are signals coming from the prototyped electronic system, i.e. output signals of the FPGAs, the microprocessors, the I/O devices and so on mounted on the secondary boards 4501–450m, which through the electrical interconnection system of the prototyping apparatus are fed back to the clock board 130.

Each clock subsystem 501–508 also receives an external source clock signal ECK1–ECK8 coming from a clock generator device, external to the prototyping apparatus and not shown in the drawings, connected to the clock board 130 through, for example, BNC connectors 511–518 provided with on the clock board 130.

Optionally, one or more of the clock subsystems 501–508 (in the exemplary embodiment, all the clock subsystems) have a further source clock signal input available for receiving a further source clock signal PCK1–PCK8. In this exemplary embodiment, such a further source clock signal PCK1–PCK8 comes from the compact PCI single board computer 120, through the PCI bus 140a and dedicated pins of the connector of the clock board 130 which connects the latter to the back-plane 105. It should be pointed out that the function of the compact PCI single board computer 120 could be carried out by one of the main boards, programmed to carry out such a function.

The internal source clock signals ICK1–ICK8 are fed to the clock subsystems 501–508 by means of a switch matrix 521, part of an hardware programmable device such as a programmable logic device (PLD) or a programmable array logic (PAL) 52. The switch matrix 521 receives from pins of the clock board connector a plurality of signals ICK, coming from the prototyped electronic system, i.e. from the FPGAS, the microprocessors, the I/O devices and the like. The switch matrix 521 is programmable to define a prescribed interconnection pattern between the input lines thereof, carrying the signals ICK, and the output lines thereof carrying the eight internal source clock signals ICK1–ICK8 to be fed to the clock subsystems 501–508. In this way, eight prescribed signals of the plurality of signals ICK can be fed to the eight clock subsystems 501–508 as internal source clock signals ICK1–ICK8.

A source clock select signal generator 522, for example implemented in a portion of the PLD 52, generates signals CS1–CS8 which are fed to the clock subsystems 501–508 as clock generation/distribution mode select signals.

An electrically erasable and programmable non-volatile memory 53 such as an EEPROM stores configuration data for the clock board 130. In particular, the memory 53 stores configuration data for the PLD 52, defining the interconnection pattern implemented to form the switch matrix 521, and the state of the clock generation/distribution mode select signals CS1–CS8. The configuration data stored in the memory 53 are downloaded from the host computer associated with the prototyping apparatus.

The clock board 130 further includes a microcontroller 54 communicating with the memory 53. In addition to the programming data for configuring the PLD 52, the memory 53 also stores a microprogram to be executed by the microcontroller 54. The microcontroller 54 delivers control signals CNT1–CNT8 to the clock subsystems 501–508. Preferably, the microcontroller 54 communicates directly with the external world by means of a serial port 55, connected to a dedicated connector 56.

The clock board 130 additionally comprises a JTAG interface for testing the components thereof: the TDI JTAG signal is fed to the memory 53, and the TDO JTAG signal is outputted by the PLD 52.

Each clock subsystem 501–508 has a total of twenty outputs, which are connected to the clock signal distribution network. All the twenty outputs deliver a same clock signal. Sixteen outputs 5011–5081 of each clock subsystem 501–508 are distributed, through the clock signal distribution network, to all the four socket elements of the four sockets 210a–d of each main board 115. Consequently, each socket element of each socket 210a–d receives the eight clock signals CK1–CK8, one from each clock subsystem. Two outputs 5012–5082 of each clock subsystem 501–508 are distributed one to the socket 145a for the cross-bar board 135a and the other to the socket 145b for the cross-bar board 135b. Two further outputs 5013–5083 of each clock subsystem are fed back to the clock subsystem itself.

Figure 6:
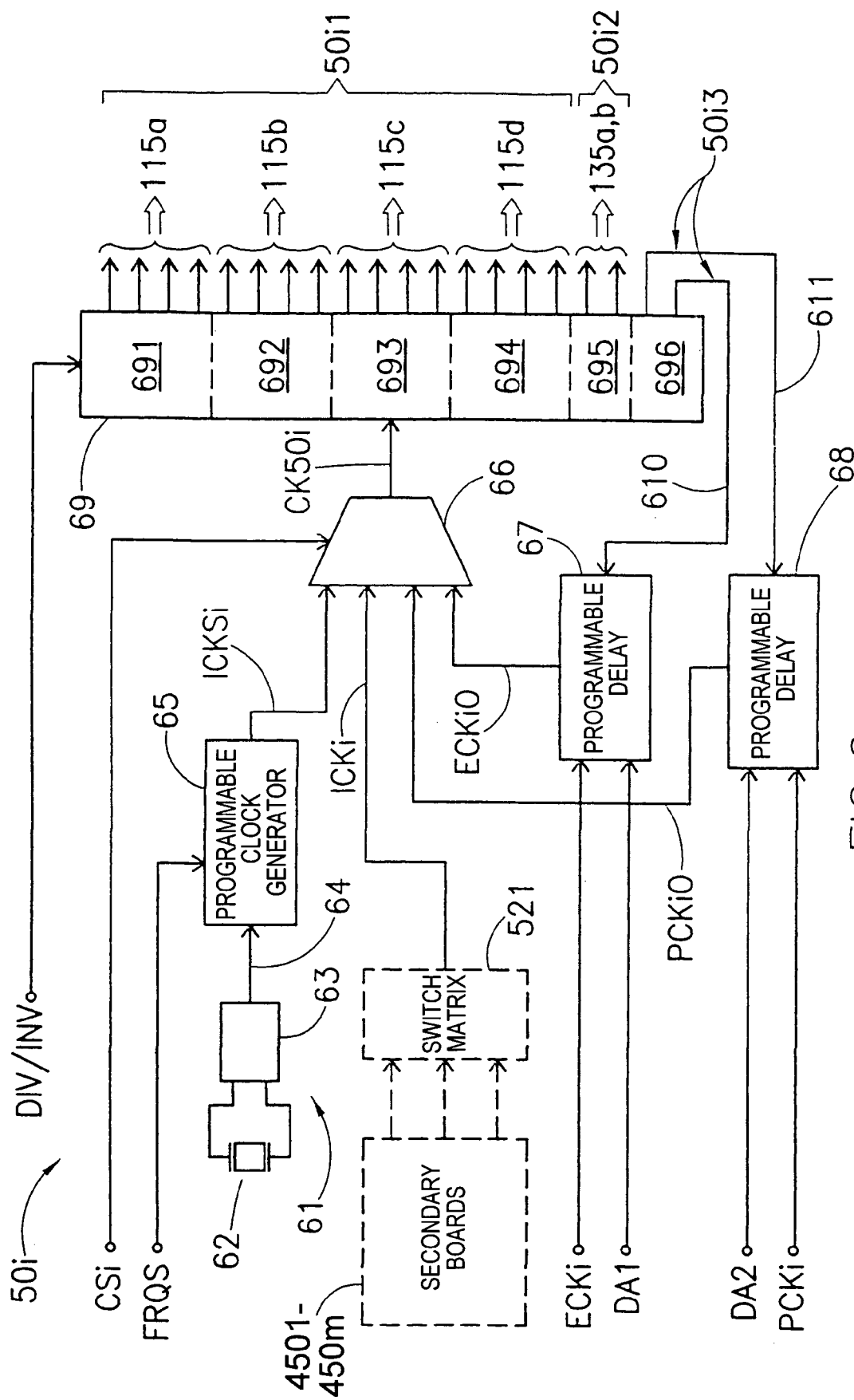
FIG. 6 is a schematic block diagram of a subsystem of the clock distribution board.

Referring now to FIG. 6, a schematic block diagram of a generic clock subsystem 50i (i=1 to 8) is shown. The clock subsystem comprises a local oscillator 61, for example a crystal oscillator based on a crystal quartz 62 coupled to an oscillator circuit 63, for generating a periodic signal 64 at a given frequency. The periodic signal 64 is fed to a clock generator circuit 65 which, at an output thereof, generates an internal clock signal ICKSi. The clock generator circuit 65 is programmable to set a prescribed clock frequency starting from the periodic signal 64. The internal clock signals ICKSi outputted by the clock generator circuit 65 has a frequency which is a multiple or a submultiple of the frequency of the periodic signal 64. The clock generator circuit 65 is controlled by frequency selection signals FRQS, part of the control signals CNTi coming from the microcontroller 54, which allow to set the desired frequency for the internal clock signal ICKSi. The local oscillator 61 and the clock generator circuit 65 can be for example practically implemented by means of the ICS307 serially programmable clock source component produced and sold by ICS®.

The internal clock signal ICKSi is fed to a first input of a fast switch 66.

It is pointed out that the provision of the clock generator circuit 65 is not strictly necessary: the periodic signal 64 generated by the local oscillator 61 could in fact be directly fed to the fast switch 66. The provision of the clock generator circuit 65 increases the flexibility of the clock subsystem, because several different frequencies can be set starting from the single frequency of the periodic signal 64. Preferably, the quartz crystal 62 is not soldered to the clock board 130, but rather it is removably mounted in a suitable socket, so to allow the substitution with a different quartz having a different resonation frequency.

A second input of the fast switch 66 is fed with the internal source clock signal ICKi selected by the switch matrix 521 among the signals ICK coming from the prototyped electronic system.

The external source clock signal ECKi supplied to the clock board 130 by the external clock generator is fed to circuits, schematised globally as a block 67, including a clock driver, a phase-locked loop (PLL) and a skew control circuit. An output ECKiO of these circuits, forming a clock signal derived from signal ECKi, is supplied to a third input of the fast switch 66. The block 67 can for example be physically implemented by means of the CY7B9911V high-speed programmable skew clock buffer produced and sold by CYPRESS®.

Optionally, the clock signal PCKi coming from the compact PCI board 120 is fed to circuits, schematised globally as a block 68, which, similarly to block 67, include a clock driver circuit, a PLL and a skew control circuit. An output PCKiO of block 68, forming a clock signal derived from signal PKCi, is fed to a fourth input of the fast switch 66. As for block 67, the block 68 can be physically implemented by the CY7B9911V component.

The circuit blocks 67 and 68 are also fed with respective control signals including delay adjust signals DA1, DA2, part of the control signals CNTi coming from the microcontroller 54. The delay adjust signals DA1, DA2 allow to set prescribed delays of the signals ECKiO and PCKiO with respect to their counterparts ECKi and PCKi.

The fast switch 66 is controlled by clock selection signals CSi coming from the PLD 522. The clock selection signals CSi allow to select which one of the four fast switch inputs ICKSi, ICKi, ECKiO, PCKiO is to be fed to an output CK50i of the fast switch 66.

The output CK50i of the fast switch 66 is fed to a low-skew clock driver circuit 69. The clock driver circuit 69 allows to distribute the clock signal on the output CK50i of the fast switch 66 to a plurality of clock signal distribution outputs 50i1 and 50i2, assuring a low skew between the signals on the clock signal distribution outputs. The clock driver circuit has a plurality of outputs, twenty in the shown example, connected to respective lines of the clock signal distribution network. The outputs of the clock driver circuit 69 are ideally divided in six groups. A first group of outputs of the clock driver circuit 69 comprises four outputs connected to respective clock signal distribution lines for distributing the clock signal CK50i to the four sockets 210a–d of the first main board 115a. Similarly, a second, third and fourth groups of outputs of the clock driver circuit 69 comprise each four outputs connected to respective clock signal distribution lines for distributing the clock signal CK50i to the four sockets 210a–d of the second, third and fourth main boards 115b–d, respectively. A fifth group of outputs of the clock driver circuit 69 comprises two outputs connected to respective clock signal distribution lines for distributing the clock signal CK50i to each of the two cross-bar boards 135a,b. A sixth group of outputs of the clock driver circuit 69 comprises two outputs connected to lines 610, 611 local to the clock board 130 which allow to fed the clock signal CK50i back to the circuits of blocks 67 and 68, respectively, for the PLLs included therein. The clock driver circuit 69 also has control inputs for frequency division and polarity inversion control signals, indicated globally by DIV/INV in the drawing. These control signals, which are for example supplied by the PLD 522, allow to set a frequency division factor and a 180° phase shift of the output clock signals with respect to the input clock signal CK50i. From a practical viewpoint, the clock driver circuit can for example be implemented using the ICS8701–01 low skew clock generator produced and sold by ICS®.

Each time the design of an electronic circuit under validation has been scattered across several FPGAs, these FPGAs are mounted onto corresponding secondary boards 405. The local resource devices for each FPGA are mounted onto auxiliary boards 450, which are plugged into the secondary board carrying the FPGA. The other devices (such as microprocessors and I/O units) defining the real world system in which the electronic circuit is intended to operate are mounted onto different secondary boards 405. All the secondary boards, i.e. both those carrying the FPGAs implementing the electronic circuit to be validated and those carrying the other devices implementing the real world environment for the electronic circuit, are plugged into corresponding sockets 210*a–d* of the main boards 115*a–d*. The main boards are then mounted onto the back-plane 105 to form a prototyped electronic system. The clock board 130 and the other system boards 120, 125 are also mounted onto the back-plane.

The prototyping apparatus is then connected to the host computer controlling the prototyping process. Particularly, configuration data for the FPGAs, the programs controlling the microprocessors, the configuration data for the clock board 130 and the microprogram for the microcontroller 54, are downloaded into the corresponding memories through the JTAG interface. In a similar manner, the memories associated with each socket of the main boards are loaded with configuration data for the respective switches 215*a–d*, in order to define the required connectivity of the system.

More specifically, when an auxiliary board is plugged into a socket element of the secondary board, the corresponding switches on the main board are both open, so that the holes of the socket on the main board, and then also the terminals of the FPGA, are only connected to the terminals of the local resource devices mounted onto the auxiliary board (being insulated from the connections of the main board). Conversely, when a socket element of the secondary board is free, one or more of the corresponding switches on the main board are closed, so that the holes of the socket on the main board, and then also the terminals of the FPGA, are coupled with the selected connections on the main board; as a consequence, the FPGA is connected to another FPGA or to a different device either on the same main board (through a point-to-point connection) or on a different main board (through a bus of the back-plane, a cross-bar board of the back-plane, or a flexible flat cable).

The configuration of the electronic switches defines which of the eight clock signals CK1–CK8 are to be fed to each FPGA, microprocessor, I/O device and so on, and which output signal, if any, of these components shall be fed back to the clock board 130 to be used as an internal source clock signal. On the other hand, the configuration of the PLD 52 determines which source clock signal will be used by each clock subsystem 501–508 for the generation and distribution of the respective clock signal.

The prototyping process can then be started.

The solution of the present invention provides a very flexible prototyping apparatus, which allows to emulate an almost real world working condition of the prototyped electronic system where clock signals may be generated by the prototyped system itself.

Although the present invention has been disclosed and described by way of some embodiments, it is apparent to those skilled in the art that several modifications to the described embodiments, as well as other embodiments of the present invention are possible without departing from the spirit thereof.

What is claimed is:

1. A clock signal generation and distribution system for a prototyping apparatus for prototyping an electronic system, comprising:
   a clock signal distribution network, and
   at least one clock signal generation and distribution subsystem for distributing at least one clock signal to a prototyped electronic system implemented by the prototyping apparatus through the clock signal distribution network,
   wherein the at least one clock signal generation and distribution subsystem comprises:
   a clock source selector for selecting the at least one clock signal to be distributed to the prototyped electronic system among a group of source clock signals, the group including at least one first source clock signal derived from the prototyped electronic system and at least one second source clock signal not derived from the prototyped electronic system;
   and a first programmable delay clock buffer programmable to set a predetermined delay of an external source clock signal;
   wherein the at least one second source clock signal comprises a signal derived from components of the prototyping apparatus different from the prototyped electronic system, said components of the prototyping apparatus include a compact PCI subsystem, and the signal derived from components of the prototyping apparatus different from the prototyped electronic system is derived from a compact PCI subsystem clock signal through a second programmable delay clock buffer programmable to set a prescribed delay.

2. A prototyping apparatus for prototyping an electronic system, comprising
   a prototyped electronic system implemented by the prototyping apparatus, and
   a clock signal generation and distribution system for generating and distributing clock signals to the prototyped electronic system,
   the clock signal generation and distribution system comprising:
   a clock signal distribution network, and
   at least one clock signal generation and distribution subsystem for distributing at least one clock signal to a prototyped electronic system implemented by the prototyping apparatus through the clock signal distribution network,
   wherein the at least one clock signal generation and distribution subsystem comprises: a clock source selector for selecting the at least one clock signal to be distributed to the prototyped electronic system among a group of source clock signals, the group including at least one first source clock signal derived from the prototyped electronic system and at least one second source clock signal not derived from the prototyped electronic system;
   and a first progrmmable delay clock buffer programmable to set a predetermined delay of an external source clock signal;
   wherein the at least one second source clock signal comprises a signal derived from components of the prototyping apparatus different from the prototyped electronic system, said components of the prototyping apparatus include a compact PCI subsystem, and the signal derived from components of the prototyping apparatus different from the prototyped electronic system is derived from a compact PCI subsystem clock signal through a second programmable delay clock buffer programmable to set a prescribed delay.

* * * * *